(12) United States Patent
Vinarsky

(10) Patent No.: US 6,390,472 B1
(45) Date of Patent: May 21, 2002

(54) PSEUDO-COMMODITIES INTERACTIVE FUTURES TRADING GAME

(76) Inventor: Michael A. Vinarsky, 728 Red Barn La., Elgin, IL (US) 60123

( * ) Notice: Subject to any disclaimer, the term of this patent is extended or adjusted under 35 U.S.C. 154(b) by 0 days.

(21) Appl. No.: 09/496,485

(22) Filed: Feb. 2, 2000

(51) Int. Cl.$^7$ ................................................. A63F 3/00
(52) U.S. Cl. ..................................... 273/278; 273/256
(58) Field of Search ............................ 273/274, 138.1, 273/278, 256

(56) References Cited

U.S. PATENT DOCUMENTS

| | | | |
|---|---|---|---|
| 4,538,816 A | * | 9/1985 | Figueroa |
| 4,840,382 A | * | 6/1989 | Rubin |
| 5,297,031 A | * | 3/1994 | Gutterman |
| 5,713,793 A | * | 2/1998 | Holte |

* cited by examiner

Primary Examiner—Benjamin H. Layno
Assistant Examiner—V K Mendiratta
(74) Attorney, Agent, or Firm—Charles F. Lind

(57) ABSTRACT

The disclosed trading game is comprised of a clearing house setting up specific contracts defined as issues each having no innate financial value but of local, national or international interest and involving social, financial, business, political, sports, or general, etc. matters that can be influenced by the actual or potential occurrence of different events or factors. The value of the issue contract might change in value, up or down, depending on how the participants, individually and collectively, believe the resolution of the issue has been advanced, via bids/offers tendered on the contract and trading via the Internet. An important aspect of the trading would be the periodic polling by the clearing house of the interested traders as how-each believes the known current events or factors might influence the subsequent trading prices of the contract, tabulating and reporting the poll results, giving a predicted bias for all participants to evaluate and act on, and monitoring continued open trading of the contract at bid/ask/traded prices.

5 Claims, 4 Drawing Sheets

Commodity Overview — 3-4

Commodity code/detail (I/O): ChnRel (U.S/China relations may be headed towards renewed Cold War.)
Expiration Date: Sept. 30, 1999 @ 22:00 EST Overview: The U.S. government has, in recent months, begun a diplomatic campaign to renew US/China relations. More recently, it has become apparent that these relations have succumbed to increased pressure from outside sources such as: The recent bombing of China embassy, the Cox report stating Chinas relentless pursuit of military technology.

PerceptionTrade (News updates)
Code: ChnRel
News updates: (May 31, 1999) — 3-5

- Report says China aggressively sought U.S. tech.(Reuters)
- U.S. official seeks to spread blame on China spies(Reuters)
& etc...

PerceptionTrade (Poll results/Call/New issues) 06/01/99 @ 07:00 est
Code: ChnRel — 3-6

```
PT
Trader
888
              -3   -2   -1    R/C    1    2    3    Total
Question#1    25    50    0    100   200   50   75    500
Question#2    50   100   22     65    55   95  118    500
Question#3    25    93   88     66    45   25  130    500
Results      188   553   160   347   327  304   860
```

Call: Down $.20 based on a (-2 perception)

Commodity (Global/Domestic/Local (county, city, state)/Sports/Business/entertainment/medical)
   Name      Floor         PT Pit         PT CONFIDENTIAL
              Registration                 PT Discussion
           News Updates/Poll        Poll Results           Call Commodity Code: PerCap10 INDX — 3-1

| Description | News updates/Poll | Poll results | Call |
|---|---|---|---|
| | Apr. May. Jun. Jul. Aug. | | |

Open
Bid
Offer
Last

PerceptionTrade (PT CONFIDENTIAL) — 3-2

```
D    ChnRel    o           Indx      July
O    Y2K             Open   5.20
:    KSVO            Offer  5.40
                     Last   4.60
```
— 3-3

```
         Buy/Sell  Initial  Current  Current
Qty.     Price     Value    Price    Value    Flatten
 20       5.00     100.00    4.60    $80.00     20
 (5)      5.00      25.00    4.60    $22.50      5
```

Commodity overview

Commodity code/detail (I/D): ChnRel (US/China relations headed towards Cold War.) Expiration Date: Sept. 30,1999 @22:00 EST

4-1

Overview: The U.S. government has, in recent months, begun a diplomatic campaign to renew US/China relations. More recently, it has become apparent that these relations have succumb to increased pressure from outside sources such as: The recent bombing of China embassy, the Cox report stating China's relentless pursuit of military technology. Due to these recent events, the future relations of China and the United States may be headed towards cold war.

PerceptionTrade (News updates)

*Code: ChnRel*

*News updates:* (May 31, 1999)   4-2

- *Report says China aggressively sought U.S. tech.(Reuters)*
- *U.S. official seeks to spread blame on China spies(Reuters)*
- *Clinton to seek one-year trade renewal with China(Reuters)*

PerceptionTrade (Poll) 06/01/99   4-3

*Code: ChnRel*

*Welcome. Please verify your password and then proceed to polling questions below*

*Password:_____*

1. China has used a number of means to obtain the technology including joint ventures in which it pressures U.S firms to provide technology, and "front companies" to buy technology and blur its end-use.
   -3   -2   -1   0   +1   +2   +3

2. Intelligence experts have cast doubt on how much useful information was conveyed through spying.
   -3   -2   -1   0   +1   +2   +3

3. President Bill Clinton is expected to ask congress for a simple one-year extension of U.S. trading privileges for China
   -3   -2   -1   0   +1   +2   +3

PerceptionTrade (Poll results/Call/New Issues) 06/01/99 @ 07:00 est

*Code: ChnRel*
*Note: Poll's taken every 6 hours.*   4-4

| PT Trader: 500 | -3 | -2 | -1 | N/C 0 | 1 | 2 | 3 | Total |
|---|---|---|---|---|---|---|---|---|
| Question# 1 | 25 | 50 | 0 | 100 | 200 | 50 | 75 | 500 |
| Question# 2 | 50 | 100 | 22 | 69 | 55 | 85 | 119 | 500 |
| Question# 3 | 25 | 98 | 88 | 88 | 45 | 26 | 130 | 500 |
| Question# 4 | 0 | 250 | 45 | 68 | 2 | 88 | 47 | 500 |
| Question# 5 | 99 | 85 | 25 | 22 | 25 | 55 | 189 | 500 |
| Results | 199 | 583 | 180 | 347 | 327 | 304 | 560 | |

*Call:* Down $.30 based on a (-2 perception)

PSEUDO-COMMODITIES INTERACTIVE FUTURES TRADING GAME

BACKGROUND OF THE INVENTION

One form of investment is in the "futures" market, which comprises a "contract" to buy/sell a "commodity" for delivery and/or settlement before some date certain in the future; where the contract price for that commodity would typically be actively traded between the present and that expiration date based on what the traders at that time expected the price to be at that future date. Prices of the traded "futures" contracts might typically change daily due to many factors or events including the anticipated (by uncertain) supply and/or demand of the product.

Future contracts exist now for many different commodities, including popularly traded contracts for food products (grains, meats, sugar, coffee, dairy products, etc.), for industrial products (copper, precious metals, timber, oil, cotton, etc.), and/or for financial products (currencies, interest rates, stock market indexes, etc.). The contracts can be traded from specific exchanges, with local traders in trading "pits" completing orders in person and/or via an Internet connection between many local and remote traders (suppliers, users and speculators), at prices that commonly vary throughout every trading day before the contract expiration date. The futures contract might have a life measured in weeks, months, or possibly even a year or more.

A basic purpose of the futures contracts is to allow suppliers/users of the product to sell/buy such contracts, whereby they can "lock in" a future price of the commodity and thereby eliminate the uncertainty and risk of doing business while facing an unknown future price.

Of importance, every commodity contract would be for a specific physical product of a specified quality and quantity, and would have both a real value if bought/sold on a cash market now and/or at the future settlement date. Existing future contracts typically represent a rather costly value of the commodity, such as a conventional grain contract for 5,000 bushels of soybeans priced at $5.00 per bushel would represent approximately $25,000 of product. However, as product delivery would take place only when the contract matures, futures contracts generally can be bought/sold for a fraction of this total contract value, via a "margin" account.

Thus, depending in part on the price volatility of the traded commodity, specific "margins" are set generally between 5% and 20% of the contract value, or between only possibly $1,250 and $5,000 for each soybean contract. While this allows an investor with a smallish account to trade many future contracts, the high leverage margin/contract equity ratio imposes great risk. For example, a small percent contract price change (5% or $1,250 for example) will be reflected by this same dollar amount in the margin equity, as either a profit or a loss. Should margin equity be reduced to less than minimum maintenance requirements, the investor would be subjected initially to a margin call, and if not promptly met, then to being closed out from the under-margined contract. In a locked-in limit-move market, the contract might not be closed out until an investor's margin equity turned negative, whereby the investor would not only lose the margin equity but yet owe the broker any resulting negative portion.

Of further importance, as every contract being traded (or "open" contract) is represented by a "buyer" and a "seller", movement of the traded market price in either and/or both an increasing or decreasing direction will cause an equal number of winning and losing contracts. Insiders might have or probably should have a better understanding and appreciation of many current factors that might influence the traded contract price, to place speculators somewhat as an underdog or disadvantaged investor. Even if this assumption should not be so, a "small" investor with limited equity to lose is traditionally more vulnerable and at a great disadvantage versus a "large" investor. An old futures market adage is that "the market moves in the direction to hurt the most investors", vis., the small investors who hold the fewest contracts per investor. Consequently, historically many small investors end up as losers, and their futures market participation can be quite short lived.

OBJECTS AND SUMMARY OF THE INVENTION

This invention provides an interactive futures trading game that can be played without the problems and pitfalls noted above, such as possibly losing more than an established margin equity, or experiencing unfavorable trading success because of large/small investor margin equity distinctions.

An object of this invention is to provide an interactive futures trading game having contracts for pseudo-commodities that do not represent any physical commodity and thus have no innate financial value, but instead represent a stated proposition or issue having only degrees, distinctions or opinions of resolution, whereby an initial price can be arbitrarily set for trading such issue contracts. Resolution of the pseudo-commodity issue might be affected by any of many possible or real independent events, factors or activities, so that should any possibly, eminently, or actually occur, the participating traders might change their opinions as to improving or decreasing odds of a resolution of the pseudo-commodity contract issue, and induce them then to buy/sell the contracts believing a corresponding favorable price change would likely occur in the traded contract.

A further detailed object of this invention is to provide an interactive futures type trading game having a central clearing house, that would regularly "poll" active participants to seek their opinions as to how the possible or actual occurrences of real life events, factors or activities might influence pricing and thus the contract buying/selling activities of the issue contracts; that would then tabulate and post the poll results, and possibly make known its opinion of the likely direction and amount in the traded contract prices because of the poll; that would tabulate and post trading prices and results; and that would handle, record and settle resulting contract trades among the participating traders, all primarily via a broad network media such as the Internet.

Another detailed object of this invention is to provide an interactive futures type issues trading game whereby the central clearing house and participating traders together regularly might create new and interesting pseudo-commodities issue contracts for additional future trading. This might include creating "index" contracts representing composites of several specific actively traded individual pseudo-commodities issue contracts (such as a PerCap 10 Index contract comprising a composite price of the ten most active issue contracts), for allow yet additional variations or forms of trading.

BRIEF DESCRIPTION OF THE DRAWINGS

These and other objects, features or advantages of the invention will be more fully understood and appreciated after consideration of the following description of the invention, which includes as a part thereof the accompanying drawings or illustrations of typical operative monitor screens, wherein:

FIG. 3 illustrates a personalized page having contracts held or of interest to an individual trading participant in the trading game; and FIG. 4 illustrates a typical issue contract poll and the results thereof on a single page.

DETAILED DESCRIPTION OF THE INVENTION

Figure 1:
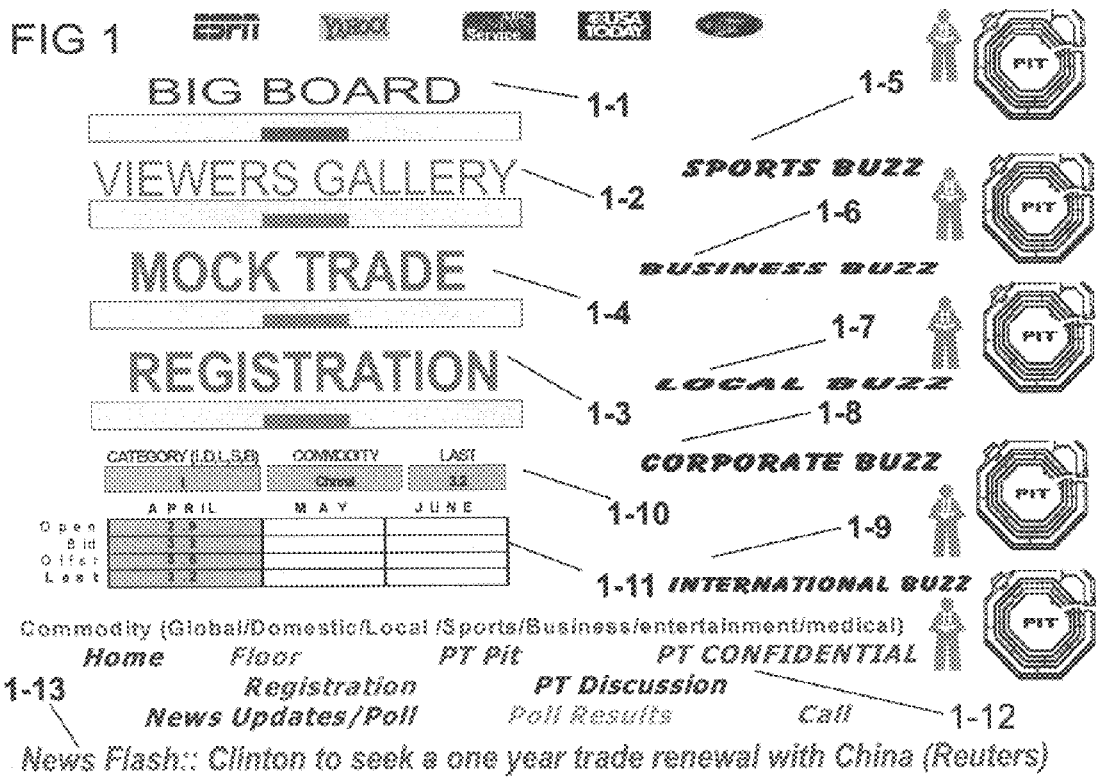
FIG. 1 illustrates a main web page that might be used by a clearing house operating the inventive futures trading game.

A. General Operation of the Trading Game

The interactive trading game will primarily be conducted on the Internet among only registered participants or traders. The game operation would comprise the use of computer monitors, etc. illustrating different screens, giving general, historical or current trading information relative to each of the different contracts being traded. The general information would include the contract definition as well as brief summaries of recent and related publically released articles and their sources, and latest poll results taken on the contract; while the trading information might include the recent contract trading price history, the current bid and asked prices, as well as possibly the day's open, high, low, and last traded prices, for all to see and use. The information generally will be available via the Internet, 24 hours a day, everyday; but actual trading of any of the contracts will only be possible during certain times and according to specific rules and requirements.

The game would have a main broker or clearing house, and every trader or participant will be required to register and be identified with the clearing house. It would be possible then to trade in a "mock" fashion, without any financial investment or risk of loss or potential of gain. Alternatively, it would be possible to open a trading account (with a small starting minimum/maximum equity such as $100.00) and to back up the trade with a financial investment, which then would be subjected to the potential of either a resulting trade gain or loss.

Every registered trader further will be identified by selected unique username, password, icon, etc., to qualify for and be secured in trading (buying or selling) contracts in the interactive futures trading game to be disclosed. The trading procedures, with no or minimum financial investment, provide that many individuals can afford to participate in the game, and the trading will typically not involve a high leverage cost/risk; overcoming the prohibitions individuals now have in not trading real or conventional futures contracts. Also, every participating and investing or equity trader (commonly referred to herein as a PT) will start off equally, to negate more normal success distinctions between large and small traders.

Each "contract" to be traded, as a pseudo commodity, will be arbitrary and without any innate or intrinsic financial value. The definition or issue of each contract will be cooperatively chosen and finalized by the registered PTs and the clearing house, being comprised as a current issue of interest to many PTs who further then might follow and/or debate it and even invest in it as will be noted. The contract issue typically could be of a local, national or international interest, or of a social, financial, business, political, sports, or general, etc. nature.

More specifically, the contract issue might be current to the extent that different events, factors or activities regularly could potentially or actually occur, where any or each of such could influence the contract issue and its possible resolution for the better or worse. Also, the contract issue should be of such significance or public interest so that the real media in the form of the press, printed and/or electronic, might regularly release news articles or press releases covering events, factors or activities that could influence the issue, whereby such could enthusiastically be debated or evaluated. The clearing house itself would actively collect and summarize such reported public comments or news items, and without verifying their accuracy, regularly republish them along with the sources thereof. This will advise potential traders of matters possibly related to the contract issue and important to its possible future resolution, and could also interest them in trading the issue contract.

The initial trading price of every issue contract will be set by the clearing house, typically at a mid-level price, such as between $5 and 20, which are popular and allow for reasonable movement up or down.

Of great importance to the inventive futures game, the clearing house further will actively "poll" registered traders concerning such reported public comments, seeking their opinions how such matters might influence the resolve of the specific contract issue. The "poll" can typically be contained on a drop down menu on the monitor, and might contain many statements or questions related to that pseudo commodity contract issue. When responding to the poll, every respondent will rate the possible significance or influence each poll statement/question might have on the resolution of the contract issue: firstly for potentially influencing the contract price for the better or the worse, and secondly by an anticipated little bit or a lot.

A typical poll will include several statements/questions concerning issue related pending events, factors, activities, etc., and participants could respond to each with their opinions as to how such might affect the resolution of the contract issue, and/or further then possibly change the contract price, up or down and in a significant or minor manner. Even though one's responses of all polled statements/questions might suggest both potential up and down contract price changes, the poll nonetheless might suggest an opinion that there might exist a probable singular overall price bias, up or down and of a small or large magnitude.

Although the poll responses will be made independently at the discretion, wisdom and/or gut feeling of each PT, all of the responses collectively could or should provide a broader and potentially more significant and reliable viewpoint of potential future contract trading action. After the conclusion of the poll, the clearing house will tabulate the poll responses and will make the results public; whereby everyone can then reevaluate the poll significance, possible resolve of the contract issue, and possible contract price shifts. The clearing house, based on numerical analysis of the poll data, might also give its own "call" on a probable price shift. The polls will be offered frequently and on a regular basis, such as possibly every three/four hours or several times a day, with prompt clearing house compilation and reporting.

The poll events, factors, activities, etc. and the poll responses overall will likely make for increased issue awareness and knowledge, trading interest, potential price movement, or a move toward a clearer resolve of the contract issue.

While the influence of such poll events, factors, activities, etc. will not be exact; such yet might be important for reevaluating the contract issue and possible resolution, and the likely resulting future trading price of the contract. Every trader actively following the contract could be influenced by the poll results, and the interactive resulting price changes, to buy or sell (trade) the contract. Of course, the actual price changes, up or down and the corresponding size, would depend on the trading activity of the contract, which will be a function of the perceived collective significance of all participating traders. In any regard, an astute PT having the correct perception of the poll responses and/or their significance and/or accuracy could be rewarded by making timely and appropriate purchases/sales of the issue contract.

In addition to the specific issue defining language, each pseudo commodity contract will have a defined trading expiration date, minimum trading price differential, and maximum daily limit move. Further, it will be preferred to have a set minimum trading price above zero value, where if such minimum is reached, continued trading can only be at that price or higher. This will help prevent total depletion of any trader's equity account. Before the expiration of the contract, all positions will have to be closed out; however, as in conventional "future" contracts, a like position could be maintained by buying/selling into a later expiration contract concerning the same or closely related issue.

B. Examples of Issue Contracts, New Releases and Polls The following pseudo commodity might be typical of such issue contracts that can be used in the disclosed trading game.

1. Pseudo Commodity: Political—Code/detail (P-ChnRel)

US/China relations headed towards Cold War

Expiration Date: Jun. 7, 2000 @ 20:00 EST

Overview: The U.S. government is on a diplomatic campaign to renew and expand U.S./China relations. However, recent factors, such as: Republican Party charges that China contributed funds to the 1998 U.S. elections; the Cox report suggesting China's relentless pursuit of military technology; and the U.S. bombing of China's embassy, raise a possibility that United States-China relations could actually deteriorate.

This issue is stated in such a manner that contract prices should decline upon improved United States-China relations (a positive political effect ?), while declining political relations likely could result in higher traded contract prices.

Typical "news releases" potentially affecting such a contract issue might be as follows:

News update—Political—Code/detail (P-ChnRel)

News update: (Feb. 3, 2000)

Report says China aggressively sought U.S. technology (Reuters) U.S. may have lost nuclear secrets to China spies (Reuters) China blasts Cox report as being racist and arrogant (Kyodo) Clinton seeking one-year trade renewal with China (WalStJ) China says U.S. nuclear "secrets" on Internet (WashNews)

A sample contract issue "poll" issue might be as follows:

(Poll) 1/15/00—Political—Code/detail (P-ChnRel)

Please verify your password to respond to the statements below, with your opinion how each might impact the contract price:

−3 being most negative and +3 being most positive

Password ()

1. China has tried to obtain technology classified by the U.S. as "secret" by creating joint ventures or "front companies" with U.S firms and thereby blurring its access to such technology.

−3 −2 −1 0 +1 +2 +3

2. Intelligence experts have cast doubts on how useful information conveyed through spying might actually be.

−3 −2 −1 0 +1 +2 +3

3. President Bill Clinton is expected to ask Congress for a simple one-year extension of U.S. trading privileges for China.

−3 −2 −1 0 +1 +2 +3

4. China's ambassador claims the Cox report was a blatant attempt to "fan up anti-China feelings, smear China's image, and contain China's development".

−3 −2 −1 0 +1 +2 +3

5. China vows to terminate all dialogue concerning military and arms control and human rights, until U.S. compensates it for the embassy bombing and punishes those responsible.

−3 −2 −1 0 +1 +2 +3

A sample "poll result" might be as follows:

Participation Trade (Poll/results/ P-ChnRel 01/15/00 @ 07:00 EST

Opinions of impact on the contract price:

| | −3 the most negative and +3 the most positive | | | | | | |
|---|---|---|---|---|---|---|---|
| | −3 | −2 | −1 | 0 | +1 | +2 | +3 |
| Statement #1 | 25 | 50 | 75 | 25 | 200 | 50 | 75 |
| Statement #2 | 50 | 100 | 22 | 69 | 55 | 85 | 119 |
| Statement #3 | 25 | 98 | 88 | 88 | 45 | 26 | 130 |
| Statement #4 | 20 | 230 | 45 | 68 | 2 | 88 | 47 |
| Statement #5 | 99 | 85 | 25 | 22 | 25 | 55 | 189 |
| Totals | 219 | 563 | 255 | 272 | 327 | 304 | 560 |

In this poll, a slight majority vote is on the positive change side, so a price call should be slightly up, such as up $0.05 to $0.15 for a $10 contract. However, different PTs might use more specific analytical analysis of the data, such as offsetting the "+3" and "−3" votes, etc. to reach a singular "3" vote count, and/or weighing "3" votes greater than "2", etc. Many different opinions of the poll result likely will influence the trading interest and price shifts differently; however being able to predict the poll results and probable price shifts, regarding both direction and magnitude, will likely be profitable. As each PT can make only one vote per poll, regardless of his/her invested position in the related contract, voting bias should be minimal. Furthermore, the frequency of the polls, ongoing news releases, and resultant price shifts, should stimulate contract trading and market movement overall. Internet technology will give all traders real-time data reported by the clearing house, such as market quotes and trade conformations, and news releases.

Additional examples of "contract issues" follow below:

2. Pseudo Commodity: Sports—Code/detail (S-RIP2000)

Cal Ripken not likely to finish 2000 season before retiring

Expiration Date: Oct. 7, 2000 @ 20:00 EDT

Overview: Thirty nine year old Cal Ripken began his career in 1981, and baseball's current "iron man" had since played in 2,632 straight games before voluntarily ending the streak recently. During the 1999 season, Cal twice was on the Disablied List because of back pains. These and other possible injuries are projected to force Ripken to retire before the 2000 season ends.

This issue is stated so that should Ripken continue to act his age and decline physically and quit, the contract prices would increase; whereas should his body mend to where he can play effectively, the contract prices could likely decline.

Sample "news releases" of potential interest to this contract issue might be as follows:

Participation Trade (News updates)—Code: S-RIP2000

News updates: (Jan 18, 2000)
Cal Ripkin not recovering from surgery as expected (Goolie press) Report says Chicago Cubs interested In Cal Ripkin (ChiNews) L.A. Dodgers to be sold to Microsoft founder Bill Gates (Sham)

3. Pseudo Commodity: Business—Code/detail (B-BKGPOKE)

Burger King likely to surpass McDonalds in the kid's meal category through its promotion of Pokemon creatures Expiration Date: Mar. 15, 2000 @ 20:00 EST
Overview: Fast food giant McDonald's now has the largest market share in the kid's meal category. However, Burger King has recently coupled it marketing efforts of kid's meals to the extremely popular, collectible and numerous Pokemon creatures.

This issue is stated so that with immediate increased Burger King market share, the traded contract prices would increase, as they probably would upon continuing demand for Pokeman creatures; while continuation of McDonald's success of its kid's meal promotions might notwithstanding force the contract prices lower.

Sample "news releases" of potential interest to this contract issue might be as follows:

ParticipationTrade (News updates)—Code: B-BKGPOKE

News updates: (Nov. 24, 1999)
Burger King web site overloaded with Pokemon requests (ChiTrib) McDonalds considering fourth teenie beanie baby effort (ChiTrib) Pokemon movie expected to set new records in Hollywood (Reuters) Baby found dead in crib with Pokeman carrying shell (WrldNews)

C. Adding New Issue Contracts

To keep the traded issue contracts fresh and on point, anyone can propose adding a new issue contract for trading; and after its precise language is settled, the PTs will vote to accept it.

The request for adding a new issue contract would seek information such as:

Category of proposed issue? LOCAL, MISC.

Location of proposed issue is? USA/ILLINOIS/CHICAGO

Estimated duration of issue? 6 MONTHS

Has proposed issue been addressed in media? YES

The description of a proposed issue could be:
Overview: The Chicago area has only one major electric power contractor (ComEd). Chicago and its suburbs have experienced power losses recently on a regular basis, some local areas being without power for days. ComEd has acknowledged that it operates with dated infrastructure, but claims such is being upgraded regularly. Nonetheless, Chicago has proposed bringing in another power contractor for added competition. However, competition could split authority, responsibility, accountability, etc. of providing power to local customers, to do more harm than good. Key reasons contract could have trading liquidity/interest are:

1. Over 20 million people now obtain power from ComEd.

2. Needed infrastructure changes are extensive/expensive.

3. Paper and electronic media report almost daily on issue.

The issue contract would be: Local—Code/detail (L-COMED-ORD) Chicago's efforts to bring in another electrical contractor likely to confuse more than solve, and should not occur.

Expiration Date: Aug. 15, 2000 @ 20:00 EST (News updates)—Code: Local—Code/detail (L-COMED-ORD)

Mayor Richard Daley meets with alternate power company (Goolie) Report says recent power loss cost ChiBdOfTrade $4 Mill (Herald) ComEd outlines plan to revamping entire infrastructure (Trib.)

D. Monitor Screens and Additional Operating Details

Of further interest, the issue contract trading game will be run through the clearing house, on the Internet; and thus will strive to have user friendly monitor screens. An initial web page illustrated in FIG. 1 thus might include control links for different activities, such as: the "big board" link 1-1 that would shift to a screen showing tabulations of all traded contracts, with current prices, etc.; the "viewers gallery" link 1-2 that would shift to a screen showing an overview of trading pits for the most popular trading contracts, and the live trading action thereat; the "registration" link 1-3 for registering participants with the clearing house; and the "mock trade/registration" link 1-4 for shifting to a screen suited for undertaking mock or free trading of any contract. The initial web page further might include links for shifting to popular issue categories, such as: the "Sports" link 1-5, the "Business" link 1-6, the "Local" link 1-7, the "Corporate" link 1-8, and the "International" link 1-9, for example. A direct approach to an issue contract could also be taken via the control links 1-10 by first clicking on the left window for the category selection (I, D, L, Sr B for example) and then clicking on the center window for scrolling to the desired specific category issue contract of interest, whereupon the right window and underlying table 1-11 would show the latest price information on that contract. Additional direct shifts to screens of interest can be made by clicking on the spaced printed words 1-12 near the bottom of the screen; and Random News Flashes 1-13 further might be posted across the bottom of the screen, changing every few seconds.

An overhead views of a typical trading pit might be used in the game for adding realism and/or participant excitement.

Figure 2:
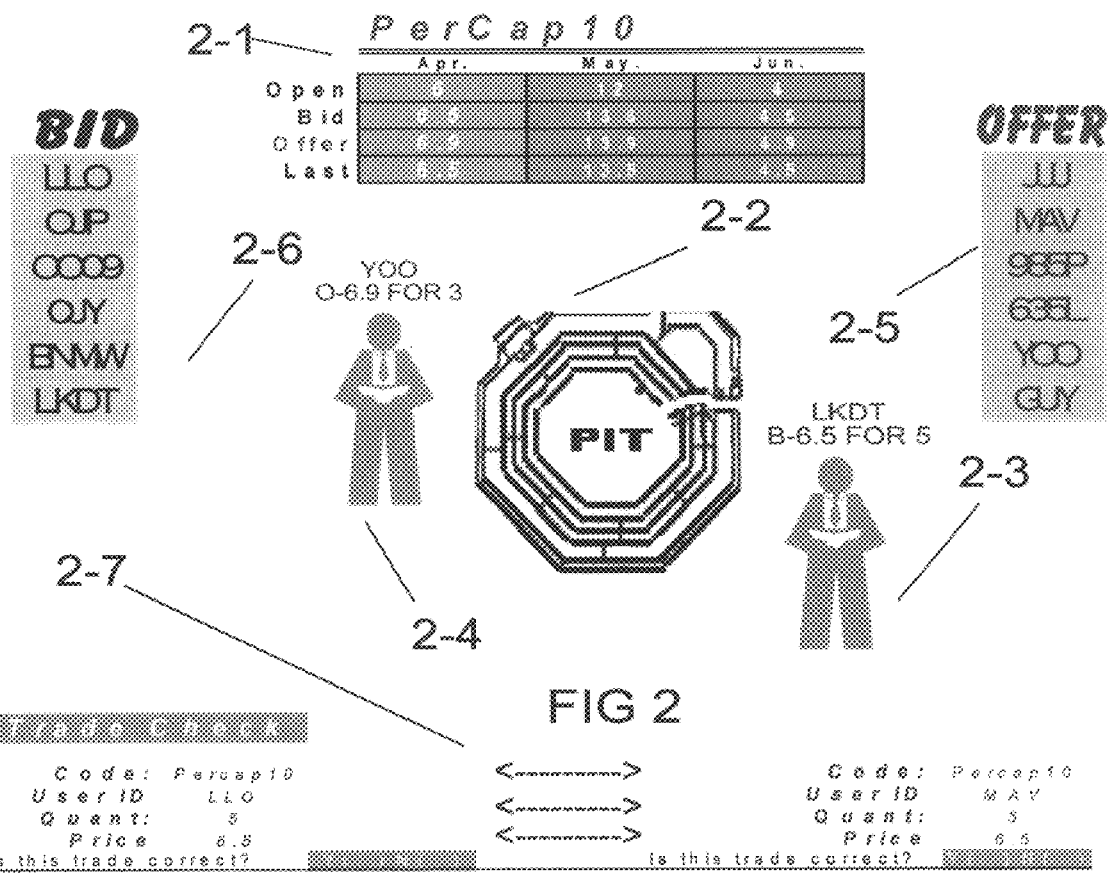
FIG. 2 illustrates a pit for trading a typical game contract.

Each specific traded contract would have its own screen, where FIG. 2 shows a trading screen of an index type contract identified as PerCap10 INDX, which would be set up as a composite of several popular specific issue contracts. The Index contract would have no expiration date, thereby allowing if desired a PT to roll any equity remaining in an expiring issue contract into the index contract automatically. Associated with each contract screen would be a table 2-1 of prices (such as last, current bid and offered, and high and low of the trading day), possibly also the traded volumes and open interests. The table might also give similar details for different months of expiration of related contracts. A symbolic trading pit 2-2 would have several buyer and seller PTs icons or stick FIGS. 2-3 and 2-4 facing one another and/or having open and/or animated waving arms, swaying bodies, etc. to simulate real-life trading. The buyer/seller figures preferably would be highlighted by different colors, such as buyer 2-3 in blue and seller 2-4 in red. Each PT icon preferably can be personalized to be of unique style of dress (jackets, ties, etc.) and/or of male/female distinction and/or specific ethnic or racial origins; and each would be identified by an acronym or trading symbols (such as "jpg" or "cfl") of their choose. Expanded pit areas 2-5, 2-6 proximate the pit 2-2, would hold additional PTs, identified by acronyms or trading symbols, that have the same bid/offer prices (bid to buy and offer to sell) as in the pit 2-2. Software programming will block out bids that are lower than the highest bid, as well as block out offers that are higher than the lowest offer, so that the pit and windows (2-2, 2-5, 2-6) would have similar prices. The identified traders would be identified permanently in a thin market but otherwise might be identified only every ten seconds or so in an active market, by flashing or changed icons. In a typical market, software programming would automatically and randomly shift the active PTs between the pit 2-2 and respective window 2-5, 2-6 locations, so that added excitement might be experienced in seeing one's acronym in the trading pit 2-2.

Upon a bidding/offering PT clicking on the opposite PT (such as "jpg" clicking on "cfl"), the program will automatically pull the buyer and seller out of the pit or window area to checking area 2-7 and require each to confirm the resulting trade, at the price of the PT being clicked on. If the buyer/seller confirm the trade (by each clicking on the "Y"s in the trade check area 2-7), the trade would automatically be recorded by the clearing house and its price posted on a completed trade board. If more than one contract is involved in the bidding/offering, the number of contract of the bid/offer will be tagged with their icon. Any trader pulled out of the pit for checking after making a trade would be randomly replaced by a PT from the pit window area.

PTs not having the closest bids/offers will not be identified, and will not appear in the pit/window areas 2-2, 2-5, 2-6. However, such PTs can become involved and can be shifted into and out of the pit/window areas by changing their bid/offer price to that of the pit price, or by having the pit bid/offer price move to coincide with their bid/offer price. While in or out of the pit, before being involved with any actual trade each PT has the option to change their bid/offer status, with respect to the price or number of contracts to be traded. PTs having standing bid/offer prices outside of the range being traded in the pit might be grouped in a separate area, known as the "floor"; but it is probable and preferred that their numbers, identities, and prices of interest would be hidden from all. However, as noted above, should the pit prices move to their price level, they would then randomly be identified by their status as buyer or seller, by their acronym, and drawn into the pit areas.

FIG. 3 illustrates another potential monitor screen, having the current bid/ask/last prices of any of the issue contracts shown at 3-1; having one's own portfolio of issue contracts grouped at 3-2 and designed to one's needs, such as: having one's entry price and value, and current price and value identified, along possibly with the profit or loss figures calculated and shown should one buy/sell out of the contract at the current price. The "overview" of any desired issue contract of interest can be viewed at 3-4; the latest news update or the news update of any date can be viewed at 3-5; and the latest related poll results can be viewed at 3-6.

In FIG. 4, a contract overview 4-1, news updates 4-2, the poll statements at 4-3 and poll results at 4-4 are grouped together for a specific issue contract of interest, making for easy review and analysis by the PTs as each might elect to do.

The clearing house further might create a "chat" room, or PT Discussion, where PTs might exchange quarries, viewpoints or whatever. The clearing house would at all times via the Internet make available official collected information, such as the history of each of the traded contracts, in language, prices, news releases and updates, polls and poll results; for any and all to see and use as desired. Of potential interest and importance also, the data collected by the clearing house might be sorted for uses beyond in the trading game, such as an issues exploring or demographic sensitive marketing tool. For example, the contract issue itself can be directed to most meaningful or commercially or politically significant, but possibly politically insensitive matters; and further the poll and poll results could be used in valuable ways beyond helping PTs trade the contracts. The breadth of game participation could be world-wide. The clearing house will have servers and software programs that will strive to limit the actual loss of any PT to the original investment only, such as $100.00. This might be effected also by setting minimum or maximum prices for every issue contract, to provide that when reached, the traded price would become locked in at these prices. Strict maintenance and/or margin requirements would be set and followed by the clearing house, to preclude reckless or overextended trading. The active trading of any of the issue contracts might also provide a greater advance or understanding of the issue itself. Participation in the game further will provide learning tool and experiences that could positively reflect on any PT's current or future work positions. It is important to understand that all or these markets will be stimulated by each PT's opinion or perception of the news events, poll and poll results, and resulting price movement; and market quotes and conformations will be shown almost at near real time vis the Internet.

While the trading game has been described in great detail, it will be understood that any none noted details can be or are of conventional trading practice and not of novel consequence. Specifically, the scope of the invention is to be limited only by the breadth of the following claims.

What is claimed is:

1. A futures trading game played by a plurality of participants utilizing data terminals and the Internet, comprising the combination of
   means for providing a pseudo commodity contract displayed on and available for trading via said data terminals;
   said contract being defined by a word description of an issue of interest to the participants, with said contract having no intrinsic financial value; said contract issue
   having no immediate resolution, no timetable for resolution, and no accurate means of scoring during play;
   being influenced toward a partial or complete resolution, for the better or worse, by the possible or actual occurrence of different random events or factors including information, that could be real or fantasied;
   means for setting an arbitrary price for initially trading the contract, at the then degree of issue resolution, and for setting an arbitrary termination date for trading the contracts;
   means for subsequently and periodically reporting via said data terminals of the occurrences of any such potentially influencing events, factors or information, where;
   the participants, based on the significance each places on such ongoing events, factors or information, can individually
   reevaluate each's opinion of the comparative current contract price and degree of issue resolution versus a possible or probable shift, higher or lower, of subsequently traded contract prices, and
   trade the contract accordingly via said data terminals, with each participant's profit or lose being the differences between the each's entry and exit trade prices;
   monitoring all contract trading and reporting such traded prices via said data terminals.

2. A futures trading game according to claim 1, further comprising the combination of means for periodically polling via said data terminals all participants, whether or not trading the contract, for each's opinion on a sliding scale as to how currently occurring, possible or fantasied events or factors might influence subsequent contract trading prices, and tabulating and reporting via said data terminals the collective responses.

3. A futures trading game according to claim 2, further comprising the combination of means for determining each participant's eligibility to trade contracts including having an account of initial equity value.

4. A futures trading game according to claim 3, further comprising the combination of said pseudo commodity contract issue being of a local, national and/or international significance involving social, financial, business, political, or general matters.

5. A futures trading game according to claim 4, further comprising the combination of said data terminals providing visuals illustrating a trading pit and participants thereon trading the contracts, and means for illustrating specific unique identities of participants at the trading pit.

* * * * *